(12) United States Patent
Warita

(10) Patent No.: US 12,312,740 B2
(45) Date of Patent: May 27, 2025

(54) GRAIN-FINISHED LEATHER-LIKE SHEET

(71) Applicant: KURARAY CO., LTD., Kurashiki (JP)

(72) Inventor: Masato Warita, Okayama (JP)

(73) Assignee: KURARAY CO., LTD., Kurashiki (JP)

( * ) Notice: Subject to any disclaimer, the term of this patent is extended or adjusted under 35 U.S.C. 154(b) by 588 days.

(21) Appl. No.: 17/757,783

(22) PCT Filed: Dec. 3, 2020

(86) PCT No.: PCT/JP2020/045140
§ 371 (c)(1),
(2) Date: Jun. 21, 2022

(87) PCT Pub. No.: WO2021/131590
PCT Pub. Date: Jul. 1, 2021

(65) Prior Publication Data
US 2023/0340724 A1   Oct. 26, 2023

(30) Foreign Application Priority Data
Dec. 26, 2019   (JP) .................. 2019-236450

(51) Int. Cl.
| | | |
|---|---|---|
| *B32B 27/40* | (2006.01) | |
| *B32B 5/02* | (2006.01) | |
| *B32B 7/12* | (2006.01) | |
| *B32B 27/04* | (2006.01) | |
| *B32B 27/08* | (2006.01) | |
| *B32B 27/12* | (2006.01) | |
| *B32B 27/18* | (2006.01) | |

(52) U.S. Cl.
CPC .............. *D06N 3/14* (2013.01); *B32B 5/022* (2013.01); *B32B 7/12* (2013.01); *B32B 27/12* (2013.01);
(Continued)

(58) Field of Classification Search
None
See application file for complete search history.

(56) References Cited

U.S. PATENT DOCUMENTS

| 4,039,517 A | 8/1977 | Hamamura et al. |
|---|---|---|
| 2016/0002835 A1 | 1/2016 | Meguro et al. |

(Continued)

FOREIGN PATENT DOCUMENTS

| CN | 101235195 | 8/2008 |
|---|---|---|
| JP | S49-42801 | 4/1974 |

(Continued)

OTHER PUBLICATIONS

Extended European Search Report dated Dec. 8, 2023, in Patent Application No. 20908124.9, 6 pages.

(Continued)

*Primary Examiner* — Michael J Feely
(74) *Attorney, Agent, or Firm* — Grüneberg and Myers PLLC

(57) ABSTRACT

A grain-finished leather-like sheet includes: a fiber base material; a polyurethane skin layer bonded to one surface of the fiber base material; and a polyurethane adhesion layer that bonds the fiber base material and the polyurethane skin layer to each other. The polyurethane adhesion layer includes an aqueous polyurethane as a main component and contains 0.01 to 0.45 mass % in sulfur atoms content, of a sulfate or an alkyl sulfate. The polyurethane adhesion layer exhibits coloration equivalent to pH 4.8 or less that is caused by a BCG (bromocresol green) solution.

21 Claims, 3 Drawing Sheets

(51) Int. Cl.
*C08G 18/08* (2006.01)
*C08G 18/79* (2006.01)
*C09J 175/08* (2006.01)
*D06N 3/00* (2006.01)
*D06N 3/14* (2006.01)

(52) U.S. Cl.
CPC .......... *B32B 27/40* (2013.01); *C08G 18/0819* (2013.01); *C08G 18/0866* (2013.01); *C08G 18/797* (2013.01); *C09J 175/08* (2013.01); *D06N 3/0011* (2013.01); *B32B 2250/03* (2013.01)

(56) References Cited

U.S. PATENT DOCUMENTS

| | | | |
|---|---|---|---|
| 2019/0153666 A1 | 5/2019 | Nakayama et al. | |
| 2019/0315908 A1 | 10/2019 | Hioki et al. | |
| 2020/0071452 A1* | 3/2020 | Maeda ............... | C08G 18/0823 |

FOREIGN PATENT DOCUMENTS

| | | |
|---|---|---|
| JP | S50-154401 | 12/1975 |
| JP | S63-264663 | 11/1988 |
| JP | H08-504230 | 5/1996 |
| JP | H08-140711 | 6/1996 |
| JP | 2000-273136 | 10/2000 |
| JP | 2006-124888 | 5/2006 |
| JP | 2013217006 | 10/2013 |
| JP | 2019-19304 | 2/2019 |
| WO | 94/13723 | 6/1994 |
| WO | 2014/125797 | 8/2014 |

OTHER PUBLICATIONS

International Search Report dated Feb. 16, 2021, in PCT/JP2020/045140 with English translation, 7 pages.

Written Opinion dated Feb. 16, 2021, in PCT/JP2020/045140, 4 pages.

* cited by examiner

GRAIN-FINISHED LEATHER-LIKE SHEET

CROSS-REFERENCE TO RELATED APPLICATIONS

This application is the National Stage entry under § 371 of International Application No. PCT/JP2020/045140, filed on Dec. 3, 2020, and which claims the benefit of priority to Japanese Application No. 2019-236450, filed on Dec. 26, 2019. The content of each of these applications is hereby incorporated by reference in its entirety.

TECHNICAL FIELD

The present invention relates to a grain-finished leather-like sheet with excellent yellowing resistance.

BACKGROUND ART

Conventionally, in order to prevent resin degradation caused by oxidation, a phenol-based antioxidant such as butylated hydroxytoluene (BHT) has been blended in various plastic products.

For polyurethane products, there has been known a phenomenon in which, in an environment in which the polyurethane products are in contact with, for example, a plastic packaging material (polyethylene, polypropylene, etc.) or a packaging made of paper (corrugated cardboard, etc.), a phenol-based antioxidant blended in these materials is sublimated and transferred to the polyurethane products, and the phenol-based antioxidant then reacts with a NOx (nitric oxide, nitrous oxide, nitrogen peroxide) gas in the atmosphere, thus undergoing yellowing as a result of changing so as to have a quinone structure. Such a phenomenon is called phenolic yellowing. Phenolic yellowing of polyurethane products has been a cause of discoloration of the appearance of white or light-colored products.

Several techniques have been proposed to suppress phenolic yellowing of polyurethane products. For example, PTL 1 listed below discloses a polyurethane product obtained by treating, with an organic acid or an inorganic acid, a polyurethane product including a polymer composed mainly of a polyurethane elastomer to adjust the pH of the polyurethane in the range of 6.9 to 3.5. In addition, PTL 1 describes that phenolic yellowing is likely to be caused in an alkaline state. PTL 1 also describes that the polyurethane tends to be alkaline when an antioxidant or a light-resistant stabilizer is added.

PTL 2 listed below discloses that a white shoe including an upper composed of white canvas (fibers) or a synthetic resin, a shoelace, and a shoe sole composed of polyurethane, wherein yellowing is suppressed by application of an aqueous malic acid solution.

PTL 3 listed below discloses a hardly yellowing polyurethane foam obtained by reacting a polyol and a polyisocyanate in the presence of water and an amine catalyst, wherein the polyurethane foam contains an acid component resulting from hydrolysis of a hydrolyzable ester serving as a component of the blended raw material, and exhibits a pH in an acidic range.

Meanwhile, to meet the recent increasing demand for reduction in environmental loads, improvement in industrial hygienic environments, reduction in the discharge amount of harmful substances, and the like, aqueous polyurethane liquids such as emulsions and aqueous dispersions of aqueous polyurethanes, each of which uses water as a medium are increasingly used in place of organic solvent solutions of solvent-based polyurethanes that have been widely used.

CITATION LIST

Patent Literatures

[PTL 1] Japanese Laid-Open Patent Publication No. S63-264663
[PTL 2] Japanese Laid-Open Patent Publication No. H8-140711
[PTL 3] Japanese Laid-Open Patent Publication No. 2000-27316

SUMMARY OF INVENTION

Technical Problem

It has been known that phenolic yellowing of a polyurethane is likely to be caused in an alkaline state. Conventionally, there has been known a technique for acidifying a solid polyurethane, for example, by causing an acid to permeate through the polyurethane, or adding an acid thereto. However, this technique cannot be directly applied to an aqueous polyurethane liquid used for applications such as coating. The reason is that directly adding an acid to an emulsion results in problems such as precipitation of the polyurethane due to breakage of the emulsion.

PTL 1 discloses that a polyurethane is wet-coagulated from an organic solvent solution of a solvent-based polyurethane, and is thereafter treated with an organic acid or an inorganic acid to adjust the pH of the polyurethan in the range of 6.9 to 3.5, thus producing a polyurethane product. However, such a method is a technique applied to a solid polyurethane. Accordingly, in the case of applying the aqueous polyurethane liquid, followed by drying to form a polyurethane adhesion layer, then attaching and bonding another base material to the polyurethane adhesion layer, it is difficult to cause the organic acid or the inorganic acid to permeate into the polyurethane adhesion layer.

PTL 2 discloses a method for applying an aqueous malic acid solution for a white shoe including an upper formed of white canvas or a synthetic resin, a shoelace, and a shoe sole composed of a polyurethane. However, with such a method, there is a concern that, since the aqueous malic acid solution is directly applied to a polyurethane product, the polyurethane product is affected by a malic acid to cause discoloration. Furthermore, such a method also cannot be applied to a step of applying an aqueous polyurethane liquid, followed by drying to form a polyurethane adhesion layer, then attaching and bonding another base material to the polyurethane adhesion layer.

PTL 3 discloses a hardly yellowing polyurethane foam obtained by reacting a polyol and a polyisocyanate in the presence of water and an amine catalyst, wherein the polyurethane foam contains an acid component resulting from hydrolysis of a hydrolyzable ester serving as a component of the blended raw material, and exhibits a pH in an acidic range. However, such a method is also limited in the processes to which it is applicable, and cannot be applied to a step of applying an aqueous polyurethane liquid, followed by drying to form a polyurethane adhesion layer, then attaching and bonding another base material to the polyurethane adhesion layer.

An aqueous polyurethane formed from an aqueous polyurethane liquid used for coating or a laminate adhesive is required to have high cohesive force to maintain the high adhesion to the base material. In order to impart high cohesive force to an aqueous polyurethane, urethane bonds or urea bonds for increasing the ratio of the hard segment tend to be contained at a high proportion in the aqueous polyurethane. Urethane bonds and urea bonds include a nitrogen atom including an unshared electron pair. Accordingly, when the proportion of urethane bonds or urea bonds is too high, there is a tendency that the aqueous polyurethane has a high basicity, so that phenolic yellowing is likely to be caused. However, no measures have been proposed to effectively suppress phenolic yellowing of such an aqueous polyurethane used for applications such as coating and a laminate adhesive.

It is an object of the present invention to provide a grain-finished leather-like sheet including a polyurethane adhesion layer containing, as a main component, an aqueous polyurethane formed using an aqueous polyurethane liquid, wherein phenolic yellowing of the polyurethane adhesion layer can be suppressed.

Solution to Problem

An aspect of the present invention is directed to a grain-finished leather-like sheet including: a fiber base material; a polyurethane skin layer bonded to one surface of the fiber base material; and a polyurethane adhesion layer that bonds the fiber base material and the polyurethane skin layer to each other, wherein the polyurethane adhesion layer includes an aqueous polyurethane as a main component, contains 0.01 to 0.45 mass %, in sulfur atoms content, in total of at least one selected from a sulfate and an alkyl sulfate, and exhibits coloration equivalent to pH 4.8 or less that is caused by a BCG (bromocresol green) solution.

The aqueous polyurethane is a polyurethane that is formed by dry-coagulating an aqueous polyurethane liquid such as an emulsion or an aqueous dispersion of a polyurethane. When a sulfate or an alkyl sulfate (hereinafter also simply referred to as a sulfate compound) is added to such an aqueous polyurethane liquid, the aqueous polyurethane that has been dry-coagulated from the aqueous polyurethane liquid exhibits acidity. Also, when the polyurethane adhesion layer that forms the grain-finished leather-like sheet contains a sulfate compound so as to exhibit coloration equivalent to pH 4.8 or less that is caused by the BCG solution, it is possible to suppress phenolic yellowing of the polyurethane that is likely to be caused in an alkaline state. Note that when the polyurethane adhesion layer contains more than 0.45 mass % or more, in sulfur atoms content, in total of at least one selected from the group consisting of a sulfate and an alkyl sulfate, the polyurethane adhesion layer is likely to absorb water, so that its water resistance is reduced, resulting in a reduction in the bonding strength.

It is preferable that the polyurethane adhesion layer has a sodium content ratio of 0.1 mass % or less. The sodium contained in the polyurethane adhesion layer increases the basicity of the polyurethane adhesion layer, thus causing phenolic yellowing. When the sodium content ratio in the polyurethane adhesion layer is 0.1 mass % or less, the basicity is less likely to be increased, so that phenolic yellowing of the polyurethane can be suppressed.

It is preferable that the aqueous polyurethane is an anionic self-emulsified polyurethane, since the sodium content ratio can be easily reduced, so that the aqueous polyurethane is more likely to exhibit acidity.

Advantageous Effects of Invention

According to the present invention, in a grain-finished leather-like sheet including a polyurethane adhesion layer including an aqueous polyurethane as a main component, it is possible to suppress phenolic yellowing of the polyurethane adhesion layer.

DESCRIPTION OF EMBODIMENT

Figure 1:
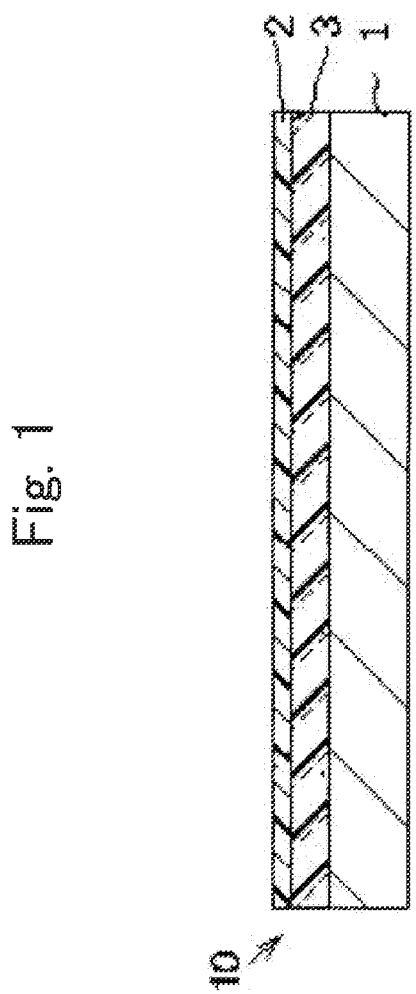
FIG. 1 is a schematic cross-sectional view illustrating a layered structure of a grain-finished leather-like sheet 10 according to an embodiment.

An embodiment of the grain-finished leather-like sheet according to the present invention will be described in detail below. Referring to FIG. 1, a grain-finished leather-like sheet 10 according to the present embodiment includes a fiber base material 1, a polyurethane skin layer 2 bonded to one surface of the fiber base material 1, and a polyurethane adhesion layer 3 that bonds the fiber base material 1 and the polyurethane skin layer 2 to each other. Also, the polyurethane adhesion layer 3 includes an aqueous polyurethane as a main component, contains 0.01 to 0.45 mass %, in sulfur atoms content, of at least one selected from a sulfate and an alkyl sulfate, and exhibits coloration equivalent to pH 4.8 or less that is caused by a EGG (bromocresol green) solution. Preferably, the polyurethane adhesion layer 3 has a sodium content ratio of 0.1 mass % or less.

Figure 2A:
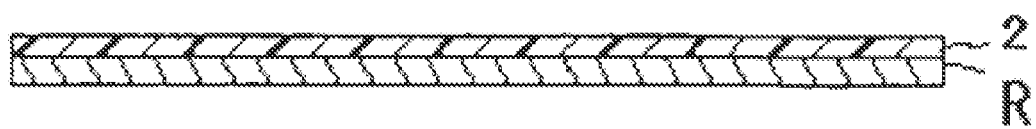
FIGS. 2A-2E show explanatory diagrams for illustrating an example of a production method of the grain-finished leather-like sheet 10 according to an embodiment.

An example of a production method of the grain-finished leather-like sheet 10 will be described with reference to FIGS. 2A-2E. First, as shown in FIG. 2A, a polyurethane skin layer 2 is formed on a release paper R.

The polyurethane skin layer (hereinafter also simply referred to as a skin layer) is a polyurethane layer that forms a grain-finished skin of a grain-finished leather-like sheet. The type of the polyurethane for forming the skin layer is not particularly limited, and the skin layer may be a polyurethane layer composed mainly of an aqueous polyurethane formed by application of an aqueous polyurethane liquid and subsequent dry coagulation, or may be a solvent-based polyurethane formed by application of an organic solvent solution of a solvent-based polyurethane and so-called wet coagulation. Among these, an aqueous polyurethane is preferable because of the low environmental load.

The skin layer may include a coloring pigment and other additives as needed. The thickness of the skin layer is not particularly limited, but is preferably 10 to 200 μm, and more preferably 20 to 100 μm. The skin layer may have a monolayer structure, or a multilayer structure composed of a plurality of polyurethane layers that are formed and stacked in separate steps.

Figure 2B:
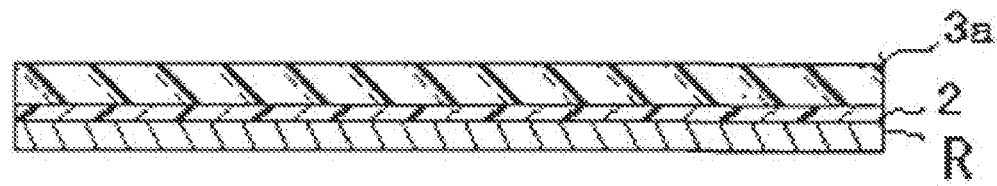

Next, a step of forming a polyurethane adhesion layer (hereinafter also simply referred to as an adhesion layer) will be described. In the step of forming the adhesion layer, as shown in FIG. 2B, an aqueous polyurethane liquid 3a to which a sulfate compound has been added is coated onto the surface of the skin layer 2 formed on the release paper R. The method for coating the aqueous polyurethane liquid 3a is not particularly limited. Specifically, for example, a knife coater, a bar coater, a roll coater, or the like can be used as appropriate. Then, a coating film of the coated aqueous polyurethane liquid 3a is dried using an infrared dryer or the like, whereby an adhesion layer 3 is formed.

The thickness of the adhesion layer is also not particularly limited, but is preferably 10 to 200 μm, and more preferably 20 to 100 μm.

Figure 2C:
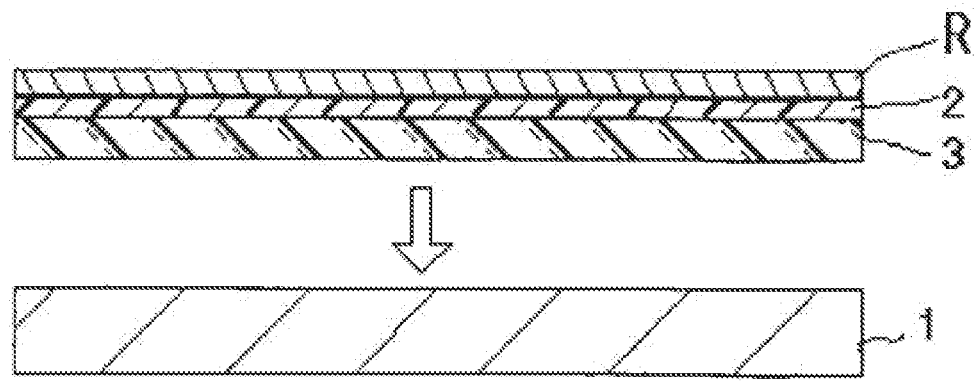
Figure 2D:
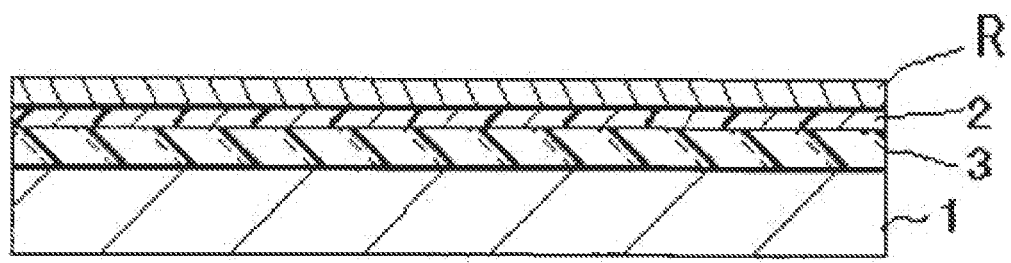

Then, as shown in FIG. 2C and FIG. 2D, the adhesion layer 3 formed on the release paper R is attached to the surface of the fiber base material 1 prepared in advance, then pressed together, and thereafter the adhesion layer 3 is cured, thus bonding the skin layer 2 to the fiber base material 1.

As the fiber base material, fiber base materials composed mainly of a non-woven fabric, a woven fabric, a knitted fabric, a sheet formed by a combination thereof, and into which an elastic polymer is further impregnated as needed, conventionally used for production of a leather-like sheet such as artificial leather and synthetic leather, may be used without any particular limitation. Among these, a fiber base material including a non-woven fabric, in particular, a non-woven fabric into which an elastic polymer has been impregnated and that includes ultrafine fibers having a fineness of 0.5 dtex or less is preferable from the viewpoint of ease of obtaining a leather-like sheet that is dense and has high mechanical strength.

The type of the resin that forms the fibers is also not particularly limited. Specific examples of the resin that forms the fibers include synthetic fibers, including for example, polyester resins such as polyethylene terephthalate (PET), polytrimethylene terephthalate, polybutylene terephthalate (PBT), and a polyester elastomer; polyamide resins such as polyamide 6, polyamide 66, polyamide 610, aromatic polyamide, and a polyamide elastomer; acrylic resins; olefin resins; and polyvinyl alcohol resins, as well as various natural fibers and semi-synthetic fibers. These may be used alone or in a combination of two or more.

The fiber base material may contain an elastic polymer impregnated therein. The type of the elastic polymer impregnated in the fiber base material is not particularly limited, and specific examples thereof include various elastic polymers, including, for example, polyurethane, acrylic elastic bodies such as an acrylonitrile-butadiene copolymer and a copolymer of an acrylic acid ester or a methacrylic acid ester, polyamide-based elastic bodies, and silicone rubber.

When the fiber base material contains an elastic polymer, the content ratio thereof is not particularly limited, but is preferably 1 to 50 mass %, and more preferably 5 to 30 mass %.

The thickness of the fiber base material is not particularly limited, but is preferably about 0.3 to 2 mm, and more preferably about 0.5 to 1 mm.

Figure 2E:
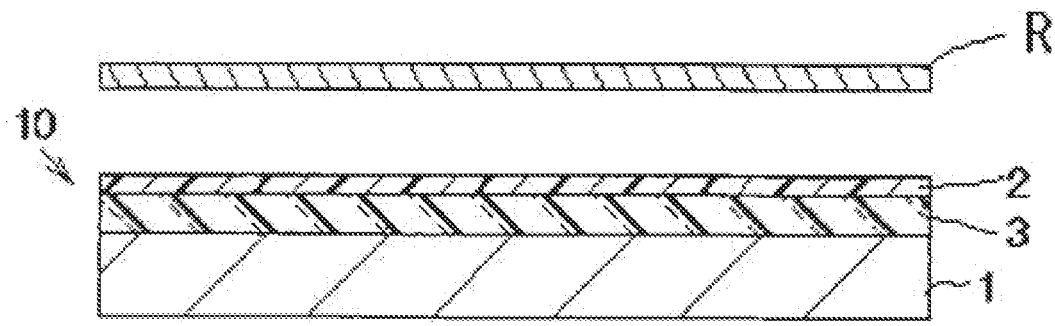

Then, as shown in FIG. 2E, the release paper R is separated from the surface of the polyurethane skin layer 2, whereby a grain-finished leather-like sheet 10 of the present embodiment is obtained.

The aqueous polyurethane for forming the adhesion layer of the grain-finished leather-like sheet in the present embodiment is a polyurethane obtained through dry coagulation from an aqueous polyurethane liquid such as a polyurethane emulsion or a polyurethane suspension in which water is used as a dispersing medium. Note that the dispersing medium may contain a small amount of an aqueous solvent. Production of a grain-finished leather-like sheet using an aqueous polyurethane can be performed with a reduced amount of organic solvent, and therefore has a low load on the global environment and the industrial hygienic environment.

The polyurethane adhesion layer includes a polyurethane that includes an aqueous polyurethane as a main component. Note that the expression "includes an aqueous polyurethane as a main component" means that the aqueous polyurethane constitutes 80 mass % or more, even 90 mass % or more, and preferably 100% of the polyurethane contained.

Examples of the aqueous polyurethane liquid include self-emulsified polyurethane emulsions obtained by introducing a hydrophilic group-containing monomer unit containing an anionic hydrophilic group such as a carboxyl group and a sulfo group, a cationic hydrophilic group such as an ammonium group, or a nonionic hydrophilic group into the molecular structure as a constituent unit of a polyurethane, and emulsifying the polyurethane through self-emulsification; forcedly emulsified polyurethane emulsions obtained by emulsifying a polyurethane through forced emulsification using a nonionic, cationic, or anionic surfactant as an emulsifier; and polyurethane emulsions using both an ionic group introduced into the polyurethane and an emulsifier.

Among these, self-emulsified polyurethane emulsions are particularly preferable since adverse effects due to bleeding of the emulsifier are less likely to occur. Among the self-emulsified polyurethane emulsions, an emulsion of an anionic self-emulsified polyurethane including, as a hydrophilic group-containing monomer unit, an anionic acidic functional group such as a carboxyl group and a sulfo group serving as a hydrophilic group, since the resulting aqueous polyurethane is more likely to exhibit acidity.

The aqueous polyurethane can be obtained by blending and reacting with, for example, a polymer polyol having an average molecular weight of 200 to 6000, an organic polyisocyanate, a chain extender and, as needed, a hydrophilic group-containing monomer as a part of the polymer polyol, the chain extender, or an end capping group, at a predetermined molar ratio. If necessary, the aqueous polyurethane has a cross-linked structure.

Specific examples of the polymer polyol include polyether-based polyols such as polyethylene glycol, polypropylene glycol, polytetramethylene glycol, and poly(m-ethyl tetramethylene glycol), and copolymers thereof; polyester-based polyols such as polybutylene adipate diol, polybutylene sebacate diol polyhexamethylene adipate diol, poly(3-methyl-1,5-pentylene adipate)diol, poly(3-methyl-1,5-pentylene sebacate)diol, and polycaprolactone diol, and copolymers thereof; polycarbonate-based polyols such as polyhexamethylene carbonate diol, poly(3-methyl-1,5-pentylene carbonate)diol, polypentamethylene carbonate diol, and polytetramethylene carbonate diol, and copolymers thereof; and polyester carbonate polyols. If necessary, a multifunctional alcohol such as a trifunctional alcohol or a tetrafunctional alcohol, or a short-chain alcohol such as ethylene glycol may also be used. These may be used alone or in a combination of two or more.

Specific examples of the organic polyisocyanate include non-yellowing diisocyanates, including, for example, aliphatic or alicyclic diisocyanates such as hexamethylene diisocyanate, isophorone diisocyanate, norbornene diisocyanate, and 4,4'-dicyclohexyl methane diisocyanate; and aromatic diisocyanates such as 2,4-tolylene diisocyanate, 2,6-tolylene diisocyanate, 4,4'-diphenyl methane diisocyanate, and xylylene diisocyanate. If necessary, a multifunctional isocyanate such as trifunctional isocyanate may also be used. These may be used alone or in a combination of two or more. Among these, hexamethylene diisocyanate is preferable because of the excellent balance between the yellowing resistance and the mechanical properties.

Examples of the chain extender include diamines such as hydrazine, ethylene diamine, propylene diamine, hexamethylene diamine, nonamethylene diamine, xylylene diamine, isophorone diamine, piperazine and derivatives thereof, adipic acid dihydrazide, and isophthalic acid dihydrazide; triamines such as diethylenetriamine; tetramines such as triethylene tetramine; diols such as ethylene glycol, propylene glycol, 1,4-butane diol, 1,6-hexane diol, 1,4-bis(β-hydroxyethoxy)benzene, and 1,4-cyclohexane diol; triols such as trimethylol propane; tetraols such as pentaerythritol; and amino alcohols such as amino ethyl alcohol and amino propyl alcohol. These may be used alone or in a combination of two or more. Among these, because of the excellent mechanical properties, it is preferable to use a combination of two or more of hydrazine, piperazine, ethylene diamine, hexamethylene diamine, isophorone diamine and derivatives thereof, and triamines such as diethylenetriamine. Monoamines such as ethylamine, propylamine, and butylamine; carboxyl group-containing monoamine compounds such as 4-amino butanoic acid and 6-amino hexanoic acid; and monools such as methanol, ethanol, propanol, and butanol may be used together with the chain extender during a chain extending reaction.

Examples of the hydrophilic group-containing monomer compound used for introducing the ionic group for self-emulsification into the polyurethane include carboxyl group-containing diols such as 2,2-bis(hydroxymethyl)propionic acid, 2,2-bis(hydroxymethyl)butanoic acid, and 2,2-bis(hydroxymethyl)valeric acid, and sulfonic acid group-containing diols such as dihydxoxyalkyl sulfonic acid.

Note that the anionic self-emulsified polyurethane contains, as a neutralizing agent, a base for improving the hydrophilicity by neutralizing a carboxyl group or a sulfo group serving as a hydrophilic group. Specific examples of such a neutralizing agent include nonvolatile bases such as sodium hydroxide and potassium hydroxide; and volatile bases, including, for example, amines such as trimethylamine, triethylamine, dimethyl ethanolamine, methyldiethanolamine, and triethanolamine, and ammonia. Among these, volatile amines such as trimethylamine and triethylamine having a boiling point of 120° C. or less, or ammonia is particularly preferable because the neutralizing agent is volatilized in a heating step for coagulating the aqueous polyurethane, so that the aqueous polyurethane is likely to exhibit acidity.

The acid value of the self-emulsified polyurethane serves as an indicator of the hydrophilic group content. The acid value of the self-emulsified polyurethane is preferably 5 to 40 mgKOH/g, and more preferably 10 to 30 mgKOH/g, from the viewpoint of the excellent balance between the water-dispersibility and the water resistance.

The aqueous polyurethane has an island-in-the-sea structure having a sea region, which constitutes a soft segment mainly formed of a polyol and having weak cohesive force, and island regions, which constitute a hard segment mainly formed of urethane bonds or urea bonds and having strong cohesive force. The aqueous polyurethane is required to have high cohesive force for maintaining the high adhesion to the fiber base material, and therefore preferably contains a high proportion of urethane bonds or urea bonds to increase the ratio the hard segment. However, since urethane bonds or urea bonds include nitrogen atoms having an unshared electron pair, the basicity of the polyurethane is increased when the proportion of urethane bonds or urea bonds is too high. In this case, phenolic yellowing tends to more likely to be caused. When the proportion of the hard segment is high and hence the cohesive force is too high. The aqueous polyurethane becomes hard, so that the adhesion to the base material or the bending resistance tends to be reduced. Therefore, the proportion of the nitrogen atoms in the aqueous polyurethane that serves as an indicator of the proportion of the hard segment is preferably 2.0 to 6.0 mass %, and more preferably 2.5 to 5.0 mass %, from the viewpoint of the excellent balance between the cohesive force and the suppression of basification of the aqueous polyurethane.

The aqueous polyurethane may have a crosslinked structure an order to improve the water resistance, the heat resistance, the adhesion, the mechanical properties, and the like. The crosslinked structure of the aqueous polyurethane may be an internally crosslinked or externally crosslinked structure, or may be a crosslinked structure formed by a combination thereof. Examples of the internally crosslinked structure include an internally crosslinked structure formed by blending a small amount of a multifunctional self-crosslinking compound such as a polyisocyanate-based compound or a multifunctional block isocyanate-based compound as a copolymer component. Examples of the externally crosslinked structure include an externally crosslinked structure crosslinked by adding a crosslinking agent containing two or more functional groups in the molecule that may react with a functional group such as a carboxyl group that is included in the monomer unit forming the polyurethane.

Specific examples of the crosslinking agent include bifunctional polyisocyanate compounds, and other multifunctional isocyanate compounds such as isocyanate compounds of a biuret type, an adduct type, or an isocyanurate type, each of which is a crosslinking agent that forms a crosslinked structure with a hydroxyl group or an amino group; and compounds having a carbodiimide group, an oxazoline group, an epoxy group, a cyclo carbonate group, or an aziridine group, and hydrazine derivatives or hydrazide derivatives, each of which is a crosslinking agent that forms a crosslinked structure with a carboxyl group. Among these, it is particularly preferable to use crosslinking agents that are compounds having a carbodiimide group or an oxazoline group, and that are excellent in reactivity and pot life.

Specific examples of the crosslinking agent having a carbodiimide group include water-dispersible carbodiimide-based compounds such as "CARBODILITE E-01", "CARBODILITE E-02", and "CARBODILITE V-04" manufactured by Nisshinbo Chemical Inc. Specific examples of the crosslinking agent having an oxazoline group include water-dispersible oxazoline-based compounds such as "EPOCROS K-2010E", "EPOCROS K-2020E", and "EPOCROS WS-500" manufactured by NIPPON SHOKUBAI CO., LTD. The blending ratio of the crosslinking agent can be selected according to the purpose or the desired resin composition. For example, the amount of the effective component of the crosslinking agent with respect to the aqueous polyurethane is preferably 3 to 15 mass %, and more preferably 5 to 12 mass %. In the case of blending the crosslinking agent, a crosslinking accelerator may be used in combination therewith. In crosslinking the aqueous polyurethane, for example, after the aqueous polyurethane has been dry-coagulated from the aqueous polyurethane liquid, it is preferable to complete the crosslinking reaction preferably by performing aging through heating.

Specific examples of the surfactant that is blended for causing forced emulsification include anionic surfactants such as sodium lauryl sulfate, ammonium lauryl sulfate, sodium polyoxyethylene tridecyl ether acetate, sodium dodecyl benzenesulfonate, sodium alkyl diphenyl ether disulfonate, and sodium dioctyl sulfosuccinate; and noionic surfactants such as polyoxyethylene nonyl phenyl ether, polyoxyethylene octyl phenyl ether, polyoxyethylene lauryl ether, polyoxyethylene stearyl ether, and a polyoxyethylenepolyoxypropylene block copolymer. It is also possible to use a so-called reactive surfactant, which has reactivity.

The average dispersed particle size of the aqueous polyurethane dispersed in the aqueous polyurethane liquid is not particularly limited, but is preferably 0.01 to 1 µm, more preferably 0.01 to 0.2 µm, and particularly preferably 0.03 to 0.5 µm, from the viewpoint of the dispersion.

Then, a sulfate and/or an alkyl sulfate is added to the aqueous polyurethane liquid, whereby a polyurethane adhesion layer formed after dry coagulation contains 0.01 to 0.45 mass %, in sulfur atoms content, in total of at least one selected from a sulfate and an alkyl sulfate. One of these may be used alone, or both of these may be used in a combination.

Examples of the sulfate or the alkyl sulfate blended in the aqueous polyurethane solution include salts of sulfuric acid or alkyl sulfuric acid esters such as lauryl sulfate or laureth sulfate, preferably ammonia salts, volatile amine salts, and sodium salts. More specific examples thereof include ammonium sulfate; salts of sulfuric acid and a volatile amine such as triethylamine sulfate; alkyl ammonium sulfates such as ammonium lauryl sulfate and ammonium laureth sulfate; salts of alkyl sulfuric acids and volatile amines such as lauryl sulfate triethylamine and laureth sulfate triethylamine, and sodium sulfate or sodium salts of alkyl sulfuric acid esters such as sodium lauryl sulfate or sodium laureth sulfate. These may be used alone or in a combination of two or more. These sulfates or alkyl sulfates cause the polyurethane adhesion layer formed after dry coagulation to exhibit strong acidity. In addition, they make the aqueous polyurethane solution weakly acidic, and therefore are less likely to reduce the dispersion stability of the aqueous polyurethane.

Among the sulfates or the alkyl sulfates described above, a salt of sulfuric acid or an alkyl sulfuric acid ester and ammonia or a volatile amine is preferable because ammonia or a volatile amine is volatilized and removed during dry coagulation under heating of the aqueous polyurethane, and thus the aqueous polyurethane is more likely to exhibit acidity. In the case of using sodium sulfate or a nonvolatile amine salt, the base component remains in the aqueous polyurethane even after dry coagulation under heating of the aqueous polyurethane, and thus the basicity of the adhesion layer tends to be increased.

The total proportion, in sulfur atoms content, of the sulfate and the alkyl sulfate contained in the formed polyurethane adhesion layer is 0.01 to 0.45 mass %, preferably 0.03 to 0.35 mass %. When the content ratio, in sulfur atoms content, of these sulfate compounds contained in the polyurethane adhesion layer is less than 0.01 mass %, the polyurethane adhesion layer becomes difficult to be sufficiently acidified. When the content ratio, in sulfur atoms content, of these sulfate compounds contained in the polyurethane adhesion layer exceeds 0.45 mass %, the water resistance of the polyurethane adhesion layer is reduced.

The polyurethane adhesion layer has a sodium content ratio of preferably 0.1 mass % or less, and more preferably 0.07 mass % or less. The aqueous polyurethane may contain sodium derived from the raw material. Specifically, the aqueous polyurethane may contain, for example, sodium, including, for example, sodium contained in hydrophilic group-containing monomer compounds such as sodium dihydroxyalkyl sulfonate for use in production of an anionic self-emulsified polyurethane; sodium contained in surfactants such as sodium lauryl sulfate, sodium polyoxyethylene tridecyl ether acetate, sodium dodecyl benzenesulfonate, sodium alkyl diphenyl ether disulfonate, and sodium dioctyl sulfosuccinate; and sodium contained in thickeners such as sodium polyacrylate. When the sodium content ratio of the polyurethane adhesion layer exceeds 0.1 mass %, the effect of increasing the acidity by inclusion of the sulfate compound is reduced. On the other hand, when the sodium content ratio of the polyurethane adhesion layer is small, or the polyurethane adhesion layer contains substantially no sodium, the polyurethane adhesion layer can be easily acidified, and thus phenolic yellowing of the polyurethane adhesion layer is less likely to occur. For this reason, it is preferable that the polyurethane adhesion layer does not contain sodium (0 mass %), and the content ratio of sodium unavoidably contained is preferably 0.1 mass % or less, and more preferably 0.07 mass % or less.

As for the acidity of the polyurethane adhesion layer formed in this manner, the polyurethane adhesion layer exhibits coloration equivalent to pH 4.8 or less, preferably pH 3.8 to 4.7, and more preferably pH 3.9 to 4.6 that is caused by a BCG (bromocresol green) solution, which is evaluated as will be described later. When the pH equivalent of coloration exceeds 4.8, the effect of suppressing phenolic yellowing cannot be achieved sufficiently. When the pH equivalent of coloration is too low, the polyurethane adhesion layer tends to be easily degraded by acid.

The solid content concentration of the aqueous polyurethane liquid is not particularly limited, but is preferably 20 to 65 mass %, and more preferably 30 to 60 mass %, from the viewpoint of the excellent balance between the dispersion stability and the increased concentration.

The thus formed grain-finished leather-like sheet according to the present embodiment includes a polyurethane adhesion layer that is less likely to cause phenolic yellowing. If necessary, the polyurethane adhesion layer may contain, in addition to the aqueous polyurethane, the surfactant, the crosslinking agent, and so forth described above, various additives and the like such as an antioxidant, an ultraviolet absorber, a pigment, a dye, an antistatic agent, a flame retardant, an anti-tacking agent, and a filler.

EXAMPLES

Next, the present invention will be described in further detail by way of examples. It should be appreciated that the scope of the present invention is by no means limited by the following examples. First, the evaluation methods used in the present examples will be collectively described below.
<Measurement of pH Equivalent of Coloration by BCG Solution>

A water/ethanol=50/50 amass ratio) solution of 0.1 w/v % of BCG was diluted by five times with distilled water, to prepare a BCG solution. The BCG solution has a yellow to blue coloration area in the range of pH 3.8 to 5.4. Then, a test piece measuring 1 cm per side was cut out from each of the grain-finished leather-like sheets produced in the examples. Then, the test piece was immersed in the BCG solution such that the bath ratio of the weight of the test piece to the BCG solution was 1:100. Since the time required for coloring is different for different degrees of water swellability of the polyurethane adhesion layers, the immersion time was set within the range of 5 to 60 minutes while checking the coloring state. The test piece that had been immersed was taken out and lightly washed with water, and excess water was wiped off from the test piece, which was then dried for 24 hours at room temperature. Then, the cross section of the test piece that had exhibited coloration through the immersion was observed with a microscope. Then, the color of the polyurethane adhesion layer and the coloration of the BCG solution measured with a pH meter was compared with each other, thus determining the pH equivalent of the polyurethane adhesion layer.

<Degree of Yellowing Caused by Phenolic Yellowing>

Based on the testing method prescribed in ISO 105-x18: 2007, phenolic yellowing treatment was performed using yellowing test papers (manufactured by GROZ-BECKERT JAPAN) containing a phenol-based antioxidant. Then, the color difference Δb* value between the b* values based on the L*a*b*color system of the test piece before and after the treatment was evaluated using a spectrophotometer. A larger Δb* value indicates stronger yellowing.

<Measurement of Content Ratios of Sulfur (S) and Sodium (Na)>

A test piece having a predetermined size was cut out from each of the grain-finished leather-like sheets produced in the examples. Then, using a scanning electron microscope (JSM-IT500 manufactured by JEOL Ltd.), elementary analysis of the polyurethane adhesion layer on the cross section of the test piece was performed with an energy dispersive X-ray spectroscope (EPS). Then, from the average of five values arbitrarily obtained in the EDS analysis, the respective content ratios of the sulfur (S) and the sodium (Na) contained in the polyurethane adhesion layer were calculated.

<Peel Strength Retention Under Moisture (Water Resistance Evaluation)>

A test piece having a length of 15 cm and a width of 3 cm was cut out from each of the grain-finished leather-like sheets produced in the examples. Then, a rubber plate having a length of 15 cm and a width of 3 cm was prepared. Then, an adhesive was uniformly applied to both the surface of the polyurethane skin layer of the test piece and the surface of the rubber plate. After being dried for 2 minutes at 100° C., the adhesive on the surface of the test piece and the adhesive on the surface of the rubber plate were attached to each other. At this time, a 3-by-3-centimeter paper was sandwiched between the adhesive surfaces at one end of the test piece, to provide a gripping portion to be used by a tensile tester. Then, the test piece was pressed for 10 seconds at room temperature with a pressure of 3 kgf/cm$^2$, and thereafter was allowed to stand for 24 hours at room temperature. Then, both ends of the test piece were each trimmed by 2.5 mm, to adjust the lateral width to 2.5 cm. Similarly, six test pieces were formed from each of the grain-finished leather-like sheets.

Peel Strength (Dry) Measurement

A distal end portion of the rubber plate, to which the test piece had been bonded, of the obtained peel test piece was clamped into one chuck, and a distal end portion of the polyurethane skin layer of the test piece was clamped into the other chuck. Then, the distal end portions were pulled by the tensile tester at a speed of 100 mm/min to peel off the polyurethane skin layer from the fiber base material. At this time, the average value of the tensile stresses of a portion of the obtained SS curve other than the initial peak was determined. The average value of the tensile stresses generated in three test pieces was converted into a value per centimeter, and the value was determined as the peel strength (Dry).

Peel Strength (Wet) Measurement

Meanwhile, before measuring the peel strength, each test piece was immersed in distilled water for 60 minutes. Then, excess water was wiped off from the test piece removed from the distilled water, and the peel strength was measured in the same manner as in the case of the peel strength (Dry), thus obtaining a value of the peel strength (Wet).

Then, from the values of the peel strength (Dry) and the peel strength (Wet) obtained in the above-described manner, the Wet/Dry peel strength retention was calculated by the following expression. This was used as an indicator of the water resistance evaluation.

$$\text{Peel strength retention (\%)} = \text{Peel strength (Wet)}/\text{Peel strength (Dry)} \times 100$$

The aqueous polyurethane emulsions, the crosslinking agents, the auxiliary agents, and so forth that were used in the present examples will be collectively described below.

(Skin Layer Polyurethane Emulsion)
- HYDRAN ULK-190 (polyether-based polyurethane emulsion having a solid content concentration of 35 mass %, manufactured by DIC Corporation)

(Adhesion Layer Polyurethane Emulsion)
- Anionic self-emulsified polyurethane A: self-emulsified polyether-based polyurethane emulsion (solid content concentration: 50 mass %, containing a hydrophilic carboxyl group, acid value: 23 mgKOH/g, neutralizing agent: triethylamine)
- Anionic self-emulsified polyurethane B: self-emulsified polyether-based polyurethane emulsion (solid content concentration: 50 mass %, containing a hydrophilic sulfo group, acid value: 4 mgKOH/q, neutralizing agent: sodium ions)
- Forcedly emulsified polyurethane C: forcedly emulsified polyether-based polyurethane emulsion (solid content concentration: 45 mass %, containing 0.75 mass % or sodium lauryl sulfate as an emulsifier)
- Forcedly emulsified polyurethane D: forcedly emulsified polyether-based polyurethane emulsion (solid content concentration: 45 mass %, containing 0.75 mass % of ammonium lauryl sulfate as an emulsifier)

(Crosslinking Agent)
- Carbodimide-based crosslinking agent: CARBODILITE V-04 manufactured by Nisshinbo Chemical Inc.
- Isocyanate-based crosslinking agent: HYDRAN ASSISTER 5 S manufactured by DIC Corporation (Auxiliary Agent and Pigment)
- Antifoaming agent: SN Defoamer 1310 (manufactured by SAN NOPCO LIMITED)
- Leveling agent: BKY-348 (manufactured by BYK Japan KK)
- Thickener: ADEKANOL UH-541-VF (manufactured by ADEKA CORPORATION)
- White pigment (aqueous titanium oxide dispersion, solid content concentration: 65%)

(Sulfate Compound)
- Ammonium sulfate (10 mass % aqueous solution)
- Ammonium lauryl sulfate (25 mass % aqueous solution)
- Sodium lauryl sulfate (30 mass % aqueous solution)

(Another Salt)
- Sodium laurate (20 mass %)

Example 1

The components were mixed according to the following composition, to prepare a skin layer coating liquid and as adhesion layer coating liquid 1.

(Skin Layer Coating Liquid)

| | |
|---|---|
| Polyurethane emulsion for forming skin layer (parts by mass; the same applies to the following) | 100 parts |
| Antifoaming agent | 0.3 parts |
| Leveling agent | 0.3 parts |

-continued

| | |
|---|---|
| White pigment | 10 parts |
| Thickener | 2.0 parts |

(Adhesion Layer Coating Liquid 1)

| | |
|---|---|
| Anionic self-emulsified polyurethane A | 100 parts |
| Carbodiimide-based crosslinking agent | 15 parts |
| Ammonium sulfate (10 mass % aqueous solution) | 4.6 parts |
| Thickener | 0.8 parts |

Then, the skin layer coating liquid was applied to the release surface of a release paper at a wet adhesion rate of 120 g/m², and dried by being heated for 5 minutes using a dryer at 90° C., thus forming a skin layer film having a thickness of 40 μm. Then, the adhesion layer coating liquid 1 was applied to the surface of the skin layer film at a wet adhesion rate of 130 g/m², and dried by being heated for 5 minutes using a dryer at 90° C., Thereafter, the resulting structure was attached to the surface of the fiber base material by being pressed by a flat-plate hot pressing machine. Note that the fiber base material included a non-woven fabric of polyethylene terephthalate (PET) fibers having a fineness of 0.1 dtex, and a polyurethane (PU) impregnated in the non-woven fabric, and had a PET/PU ratio of 90/10, a basis weight of 530 g/m², and a thickness of 1 mm. The pressing was performed for 10 seconds at a temperature of 100° C. and a pressure of 5 kgf/cm. After the pressing, aging was further performed for 72 hours at 70° C., thus allowing the crosslinking of the aqueous polyurethane A to proceed.

Then, the release paper was separated, to obtain a grain-finished leather-like sheet of Example 1, which had a thickness of 1.1 mm and a basis weight of 640 g/m². Then, the grain-finished leather-like sheet was evaluated according to the above-described evaluation methods. The results are shown in Table 1 below.

TABLE 1

| | Ex. 1 | Ex. 2 | Ex. 3 | Ex. 4 | Ex. 5 | Ex. 6 |
|---|---|---|---|---|---|---|
| Type of aqueous polyurethane | A | A | A | A | B | C |
| Type of emulsification | Self-emulsified | Self-emulsified | Self-emulsified | Self-emulsified | Self-emulsified | Forcedly emulsified |
| Self-emulsifiable group | Carboxyl group | Carboxyl group | Carboxyl group | Carboxyl group | Sulfo group | — |
| Neutralizing agent | Triethylamine | Triethylamine | Triethylamine | Triethylamine | Sodium | — |
| Emulsifier | — | — | — | — | — | Sodium lauryl sulfate |
| Salt compound | Ammonium sulfate | Ammonium lauryl sulfate | Ammonium sulfate | Ammonium sulfate | Ammonium sulfate | |
| Crosslinking agent | Carbodiimide | Carbodiimide | Carbodiimide | Carbodiimide | Isocyanate | Isocyanate |
| Sulfur (S) content ratio (%) | 0.2 | 0.2 | 0.02 | 0.4 | 0.2 | 0.15 |
| Sodium (Na) content ratio (%) | 0 | 0 | 0 | 0 | 0.1 | 0.1 |
| pH equivalent (coloration by BCG solution) | 4.3 | 4.4 | 4.6 | 4.0 | 4.6 | 4.8 |
| Phenolic yellowing (Δb) | 0.50 | 0.63 | 3.75 | 0.41 | 3.42 | 3.90 |
| Peel strength (Dry): (kgf/cm) | 4.6 | 4.3 | 4.5 | 4.5 | 4.2 | 4.4 |
| Peel strength (Wet): (kgf/cm) | 4.0 | 4.0 | 4.3 | 3.2 | 3.8 | 3.8 |
| Wet/Dry peel strength retention (%) | 87.0 | 93.0 | 95.6 | 71.1 | 90.5 | 86.4 |

| | Ex. 7 | Com. Ex. 1 | Com. Ex. 2 | Com. Ex. 3 | Com. Ex. 4 | Com. Ex. 5 |
|---|---|---|---|---|---|---|
| Type of aqueous polyurethane | D | A | A | A | A | C |
| Type of emulsification | Forcedly emulsified | Self-emulsified | Self-emulsified | Self-emulsified | Self-emulsified | Forcedly emulsified |
| Self-emulsifiable group | — | Carboxyl group | Carboxyl group | Carboxyl group | Carboxyl group | — |
| Neutralizing agent | — | Triethylamine | Triethylamine | Triethylamine | Triethylamine | — |
| Emulsifier | Ammonium | — | — | — | — | Sodium lauryl sulfate |
| Salt compound | lauryl sulfate | Sodium laurate | — | Ammonium sulfate | Sodium lauryl sulfate | |
| Crosslinking agent | Isocyanate | Carbodiimide | Carbodiimide | Carbodiimide | Carbodiimide | Isocyanate |
| Sulfur (S) content ratio (%) | 0.15 | 0 | 0 | 0.5 | 0.2 | 0.2 |

TABLE 1-continued

| | | | | | | |
|---|---|---|---|---|---|---|
| Sodium (Na) content ratio (%) | 0 | 0.1 | 0 | 0 | 0.15 | 0.15 |
| pH equivalent (coloration by BCG solution) | 4.2 | 5.1 | 4.9 | 3.9 | 5.2 | 5.0 |
| Phenolic yellowing (Δb) | 0.80 | 10.63 | 4.52 | 0.33 | 20.40 | 5.21 |
| Peel strength (Dry): (kgf/cm) | 4.2 | 4.2 | 4.5 | 4.1 | 4.3 | 4.2 |
| Peel strength (Wet): (kgf/cm) | 3.6 | 3.9 | 4.4 | 2.5 | 2.5 | 3.2 |
| Wet/Dry peel strength retention (%) | 85.7 | 92.9 | 97.6 | 61.0 | 58.1 | 76.2 |

Example 2

A grain-finished leather-like sheet was formed and evaluated in the same manner as in Example 1 except that an adhesion layer coating liquid 2 prepared in the following manner was used in place of the adhesion layer coating liquid 1. The results are shown in Table 1.
(Adhesion Layer Coating Liquid 2)

| | |
|---|---|
| Anionic self-emulsified polyurethane A | 100 parts |
| Carbodiimide-based crosslinking agent | 15 parts |
| Ammonium lauryl sulfate (25 mass % aqueous solution) | 4.0 parts |
| Thickener | 0.8 parts |

Example 3

A grain-finished leather-like sheet was formed and evaluated in the same manner as in Example 1 except that an adhesion layer coating liquid 3 prepared in the following manner was used in place of the adhesion layer coating liquid 1. The results are shown in Table 1.
(Adhesion Layer Coating Liquid 3)

| | |
|---|---|
| Anionic self-emulsified polyurethane A | 100 parts |
| Carbodiimide-based crosslinking agent | 15 parts |
| Ammonium sulfate (10 mass % aqueous solution) | 0.5 parts |
| Thickener | 0.8 parts |

Example 4

A grain-finished leather-like sheet was formed and evaluated in the same manner as in Example 1 except that an adhesion layer coating liquid 4 prepared in the following manner was used in place of the adhesion layer coating liquid 1. The results are shown in Table 1.
(Adhesion Layer Coating Liquid Composition 4)

| | |
|---|---|
| Anionic self-emulsified polyurethane A | 100 parts |
| Carbodiimide-based crosslinking agent | 15 parts |
| Ammonium sulfate (10 mass % aqueous solution) | 9.5 parts |
| Thickener | 1.2 parts |

Example 5

A grain-finished leather-like sheet was formed and evaluated in the same manner as in Example 1 except that an adhesion layer coating liquid 5 prepared is the following manner was used in place of the adhesion layer coating liquid 1. The results are shown in Table 1.
(Adhesion Layer Coating Liquid 5)

| | |
|---|---|
| Anionic self-emulsified polyurethane B | 100 parts |
| Isocyanate-based crosslinking agent | 10 parts |
| Ammonium sulfate (10 mass % aqueous solution) | 0.5 parts |
| Thickener | 0.8 parts |

Example 6

A grain-finished leather-like sheet was formed and evaluated in the same manner as in Example 1 except that an adhesion layer coating liquid 6 prepared in the following manner was used in place of the adhesion layer coating liquid 1. The results are shown in Table 1.
(Adhesion Layer Coating Liquid 6)

| | |
|---|---|
| Forcedly emulsified polyurethane C | 100 parts |
| Isocyanate-based crosslinking agent | 10 parts |
| Thickener | 0.8 parts |

Example 7

A grain-finished leather-like sheet was formed and evaluated in the same manner as in Example 1 except that an adhesion layer coating liquid 7 prepared in the following manner was used in place of the adhesion layer coating liquid 1. The results are shown in Table 1.
(Adhesion Layer Coating Liquid 7)

| | |
|---|---|
| Forcedly emulsified polyurethane D | 100 parts |
| Isocyanate-based crosslinking agent | 10 parts |
| Thickener | 0.8 parts |

Comparative Example 1

A grain-finished leather-like sheet was formed and evaluated in the same manner as in Example 1 except that an adhesion layer coating liquid 8 prepared in the following manner was used in place of the adhesion layer coating liquid 1. The results are shown in Table 1.

(Adhesion Layer Coating Liquid 8)

| | |
|---|---|
| Anionic self-emulsified polyurethane A | 100 parts |
| Carbodiimide-based crosslinking agent | 15 parts |
| Sodium laurate (20 mass %) | 3 parts |
| Thickener | 0.8 parts |

Comparative Example 2

A grain-finished leather-like sheet was formed and evaluated in the same manner as in Example 1 except that an adhesion layer coating liquid 9 prepared in the following manner was used in place of the adhesion layer coating liquid 1. The results are shown in Table 1.
(Adhesion Layer Coating Liquid 9)

| | |
|---|---|
| Anionic self-emulsified polyurethane A | 100 parts |
| Carbodiimide-based crosslinking agent | 15 parts |
| Thickener | 0.8 parts |

Comparative Example 3

A grain-finished leather-like sheet was formed and evaluated in the same manner as in Example 1 except that an adhesion layer coating liquid 10 prepared in the following manner was used in place of the adhesion layer coating liquid 1. The results are shown in Table 1.
(Adhesion Layer Coating Liquid 10)

| | |
|---|---|
| Anionic self-emulsified polyurethane A | 100 parts |
| Carbodiimide-based crosslinking agent | 15 parts |
| Ammonium sulfate (10 mass %) | 12 parts |
| Thickener | 1.5 parts |

Comparative Example 4

A grain-finished leather-like sheet was formed and evaluated in the same manner as in Example 1 except that an adhesion layer coating liquid 11 prepared in the following manner was used in place of the adhesion layer coating liquid 1. The results are shown in Table 1.
(Adhesion Layer Coating Liquid 11)

| | |
|---|---|
| Anionic self-emulsified polyurethane A | 100 parts |
| Carbodiimide-based crosslinking agent | 15 parts |
| Sodium lauryl sulfate (30 mass %) | 3.5 parts |
| Thickener | 0.8 parts |

Comparative Example 5

A grain-finished leather-like sheet was formed and evaluated in the same manner as in Example 1 except that an adhesion layer coating liquid 12 prepared in the following manner was used in place of the adhesion layer coating liquid 1. The results are shown in Table 1.
(Adhesion Layer Coating Liquid 12)

| | |
|---|---|
| Forcedly emulsified polyurethane C | 100 parts |
| Isocyanate-based crosslinking agent | 10 parts |
| Sodium lauryl sulfate (30 mass %) | 1.0 parts |
| Thickener | 0.8 parts |

Referring to Table 1, in the case of all of the grain-finished artificial leathers including the polyurethane adhesion layers obtained in Examples 1 to 7 according to the present invention, each of which contained a sulfate compound in the range of 0.01 to 0.45 mass %, in sulfur atoms content, had a sodium content ratio of 0.1 mass % or less, exhibited coloration equivalent to pH 4.8 or less that was caused by a BCG solution, and contained an aqueous polyurethane as a main component, the $\Delta b^*$ value in the evaluation of phenolic yellowing was 4 or less, and phenolic yellowing was less likely to be caused. In addition, the Wet/Dry peel strength retention in the water resistance evaluation was 70% or more, and the water resistance was also maintained.

On the other hand, in the case of the grain-finished artificial leather including the polyurethane adhesion layer obtained in Comparative Example 1, which contained sodium laurate, which was not a sulfate compound, as a salt, and had a sodium content ratio of 0.1 mass %, the coloration caused by the BCG solution was equivalent to pH 5.1, and the $\Delta b^*$ value in the phenolic yellowing evaluation exceeded 10, indicating significant phenolic yellowing. In the case of the grain-finished artificial leather including the polyurethane adhesion layer obtained in Comparative Example 2, which did not contain any salt compound, the coloration caused by the FCC solution was equivalent to pH 4.9, and the $\Delta b^*$ value in the phenolic yellowing evaluation exceeded 4, indicating significant phenolic yellowing. The grain-finished artificial leather including the polyurethane adhesion layer obtained in Comparative Example 3, which had a content ratio of the sulfate compound of 0.5 mass %, in sulfur atoms content, was less likely to cause phenolic yellowing, but had a Wet/Dry peel strength retention of less than 70% and thus had low water resistance. In the case of the grain-finished artificial leather including the polyurethane adhesion layer obtained in Comparative Example 4, which contained sodium lauryl sulfate as a sulfate compound and had a sodium content ratio of 0.15 mass %, the coloration caused by the BCC solution was equivalent to pH 5.2, indicating significant phenolic yellowing. In the case of the grain-finished artificial leather including the polyurethane adhesion layer obtained in Comparative Example 5, which contained an emulsifier and sodium lauryl sulfate as a sulfate compound, and had a sodium content ratio of 0.15 mass %, the coloration caused by the BCG solution was equivalent to pH 5.0, indicating significant phenolic yellowing.

REFERENCE SIGNS LIST

1. . . . Fiber base material
2. . . . Polyurethane skin layer
3. . . . Polyurethane adhesion layer
3a . . . . Aqueous polyurethane liquid
10. . . . Grain-finished leather-like sheet
R. . . . Release paper

The invention claimed is:
1. A grain-finished leather-like sheet, comprising:
a fiber base material;
a polyurethane skin layer bonded to one surface of the fiber base material; and
a polyurethane adhesion layer that bonds the fiber base material and the polyurethane skin layer to each other, wherein the polyurethane adhesion layer;
comprises an aqueous polyurethane as a main component,
comprises 0.01 to 0.45 mass %, in sulfur atoms content, in total of at least one selected from the group consisting of a sulfate and an alkyl sulfate, and
exhibits coloration equivalent to pH 4.8 or less that is caused by a BCG (bromocresol green) solution.

2. The grain-finished leather-like sheet according to claim 1, wherein at least one selected from the group consisting of the sulfate and the alkyl sulfate comprises a salt of sulfuric acid or an alkyl sulfuric acid ester and ammonia or a volatile amine.

3. The grain-finished leather-like sheet according to claim 2, wherein the aqueous polyurethane comprises an anionic self-emulsified polyurethane.

4. The grain-finished leather-like sheet according to claim 1, wherein at least one selected from the group consisting of the sulfate and the alkyl sulfate comprises ammonium sulfate.

5. The grain-finished leather-like sheet according to claim 4, wherein the aqueous polyurethane comprises an anionic self-emulsified polyurethane.

6. The grain-finished leather-like sheet according to claim 1, wherein at least one selected from the group consisting of the sulfate and the alkyl sulfate comprises ammonium lauryl sulfate.

7. The grain-finished leather-like sheet according to claim 6, wherein the aqueous polyurethane comprises an anionic self-emulsified polyurethane.

8. The grain-finished leather-like sheet according to claim 1, wherein the aqueous polyurethane comprises an anionic self-emulsified polyurethane.

9. The grain-finished leather-like sheet according to claim 8, wherein the anionic self-emulsified polyurethane comprises a hydrophilic carboxyl group or a hydrophilic sulfo group.

10. The grain-finished leather-like sheet according to claim 1, wherein the polyurethane adhesion layer has a sodium content ratio of 0.1 mass % or less.

11. The grain-finished leather-like sheet according to claim 10, wherein at least one selected from the group consisting of the sulfate and the alkyl sulfate comprises a salt of sulfuric acid or an alkyl sulfuric acid ester and ammonia or a volatile amine.

12. The grain-finished leather-like sheet according to claim 11, wherein the aqueous polyurethane comprises an anionic self-emulsified polyurethane.

13. The grain-finished leather-like sheet according to claim 12, wherein the anionic self-emulsified polyurethane comprises a hydrophilic carboxyl group or a hydrophilic sulfo group.

14. The grain-finished leather-like sheet according to claim 10, wherein at least one selected from the group consisting of the sulfate and the alkyl sulfate comprises ammonium sulfate.

15. The grain-finished leather-like sheet according to claim 14, wherein the aqueous polyurethane comprises an anionic self-emulsified polyurethane.

16. The grain-finished leather-like sheet according to claim 15, wherein the anionic self-emulsified polyurethane comprises a hydrophilic carboxyl group or a hydrophilic sulfo group.

17. The grain-finished leather-like sheet according to claim 10, wherein at least one selected from the group consisting of the sulfate and the alkyl sulfate comprises ammonium lauryl sulfate.

18. The grain-finished leather-like sheet according to claim 17, wherein the aqueous polyurethane comprises an anionic self-emulsified polyurethane.

19. The grain-finished leather-like sheet according to claim 18, wherein the anionic self-emulsified polyurethane comprises a hydrophilic carboxyl group or a hydrophilic sulfo group.

20. The grain-finished leather-like sheet according to claim 10, wherein the aqueous polyurethane comprises an anionic self-emulsified polyurethane.

21. The grain-finished leather-like sheet according to claim 20, wherein the anionic self-emulsified polyurethane comprises a hydrophilic carboxyl group or a hydrophilic sulfo group.

* * * * *